(12) United States Patent
Chan

(10) Patent No.: US 9,912,730 B2
(45) Date of Patent: Mar. 6, 2018

(54) SECURED COMMUNICATION CHANNEL BETWEEN CLIENT DEVICE AND DEVICE MANAGEMENT SERVICE

(71) Applicant: QUALCOMM Incorporated, San Diego, CA (US)

(72) Inventor: Adrian Chan, Sunnyvale, CA (US)

(73) Assignee: QUALCOMM Incorporation, San Diego, CA (US)

( * ) Notice: Subject to any disclaimer, the term of this patent is extended or adjusted under 35 U.S.C. 154(b) by 473 days.

(21) Appl. No.: 14/165,109

(22) Filed: Jan. 27, 2014

(65) Prior Publication Data

US 2014/0237131 A1   Aug. 21, 2014

Related U.S. Application Data

(60) Provisional application No. 61/756,727, filed on Jan. 25, 2013, provisional application No. 61/756,748, filed on Jan. 25, 2013, provisional application No. 61/756,785, filed on Jan. 25, 2013, provisional application No. 61/798,347, filed on Mar. 15, 2013, provisional application No. 61/794,977, filed on Mar. 15, 2013.

(51) Int. Cl.
*G06F 15/16* (2006.01)
*H04L 29/08* (2006.01)
*H04L 29/06* (2006.01)

(52) U.S. Cl.
CPC .............. *H04L 67/10* (2013.01); *H04L 63/08* (2013.01); *H04L 67/141* (2013.01); *H04L 67/14* (2013.01)

(58) Field of Classification Search
None
See application file for complete search history.

(56) References Cited

U.S. PATENT DOCUMENTS

| | | |
|---|---|---|
| 7,992,002 B2 | 8/2011 | Bradbury |
| 8,015,114 B1 | 9/2011 | Nachenberg |
| 8,234,408 B2 | 7/2012 | Jungck |
| 8,316,135 B2 | 11/2012 | Ford |
| 8,495,618 B1 | 7/2013 | Inbaraj et al. |
| 8,650,283 B1 | 2/2014 | Chang et al. |

(Continued)

OTHER PUBLICATIONS

International Search Report and Written Opinion—PCT/US2014/013212—ISA/EPO—dated Aug. 15, 2014.
(Continued)

*Primary Examiner* — Esther B Henderson
(74) *Attorney, Agent, or Firm* — Paradice and Li LLP

(57) ABSTRACT

Systems and methods are described that comprise issuing a request to a client device from a platform. The request is an electronic message that includes an electronic link. An acknowledgement is received from the client device, and the acknowledgement is generated upon activation of the electronic link. A secure channel is established between the platform and a client application of the client device upon receipt of the acknowledgement. Establishment of the secure channel comprises the client application logging into a care application of the platform with a device identification that was received from the platform during an enrollment transaction. A session is conducted over the secure channel, and the session comprises the care application remotely controlling the client device via the client application.

28 Claims, 3 Drawing Sheets

(56) References Cited

U.S. PATENT DOCUMENTS

| | | |
|---|---|---|
| 8,745,746 B1 | 6/2014 | Jain |
| 9,332,424 B2 * | 5/2016 | Logan .................. H04W 8/245 |
| 2002/0045437 A1 | 4/2002 | Kesler |
| 2004/0030880 A1 | 2/2004 | Kitagawa |
| 2005/0125553 A1 | 6/2005 | Wu et al. |
| 2006/0080656 A1 | 4/2006 | Cain et al. |
| 2006/0106806 A1 * | 5/2006 | Sperling .................. G06F 8/65 |
| 2006/0200856 A1 | 9/2006 | Salowey et al. |
| 2007/0006309 A1 | 1/2007 | Herbert et al. |
| 2007/0019236 A1 | 1/2007 | Sando |
| 2007/0050762 A1 | 3/2007 | Chen et al. |
| 2007/0226343 A1 | 9/2007 | Bishop |
| 2007/0265830 A1 | 11/2007 | Sidhu et al. |
| 2007/0294368 A1 * | 12/2007 | Bomgaars ............... H04L 41/22 709/217 |
| 2008/0005733 A1 | 1/2008 | Ramachandran et al. |
| 2008/0140714 A1 | 6/2008 | Rhoads et al. |
| 2008/0304421 A1 | 12/2008 | Ramasubramanian et al. |
| 2009/0044056 A1 | 2/2009 | Itoh |
| 2009/0144395 A1 | 6/2009 | Desalvo |
| 2009/0177806 A1 | 7/2009 | Nishikawa |
| 2009/0199176 A1 * | 8/2009 | Nath ........................ G06F 8/61 717/178 |
| 2009/0282128 A1 | 11/2009 | Le et al. |
| 2010/0082792 A1 | 4/2010 | Johnson |
| 2010/0130178 A1 | 5/2010 | Bennett et al. |
| 2010/0228819 A1 | 9/2010 | Wei |
| 2010/0235321 A1 | 9/2010 | Shukla et al. |
| 2011/0185303 A1 | 7/2011 | Katagi et al. |
| 2011/0238988 A1 | 9/2011 | Tanaka et al. |
| 2011/0252240 A1 * | 10/2011 | Freedman ............... H04L 63/02 713/169 |
| 2011/0264730 A1 | 10/2011 | Dattagupta et al. |
| 2012/0099024 A1 | 4/2012 | Ryu et al. |
| 2012/0167185 A1 | 6/2012 | Menezes et al. |
| 2012/0191769 A1 | 7/2012 | Lovinger et al. |
| 2012/0206760 A1 | 8/2012 | Asahara |
| 2012/0207079 A1 | 8/2012 | Wang et al. |
| 2012/0216259 A1 | 8/2012 | Okamoto et al. |
| 2013/0007190 A1 | 1/2013 | Kumar et al. |
| 2013/0077664 A1 | 3/2013 | Lee |
| 2013/0090939 A1 | 4/2013 | Robinson et al. |
| 2013/0125107 A1 | 5/2013 | Bandakka et al. |
| 2013/0191929 A1 | 7/2013 | Yin et al. |
| 2013/0198730 A1 | 8/2013 | Munireddy et al. |
| 2013/0261821 A1 | 10/2013 | Lu et al. |
| 2014/0082117 A1 | 3/2014 | Unhale et al. |
| 2014/0133656 A1 | 5/2014 | Wurster et al. |
| 2014/0237130 A1 | 8/2014 | Chan |
| 2014/0244789 A1 | 8/2014 | Chan |
| 2015/0058834 A1 | 2/2015 | Chan |
| 2015/0067667 A1 | 3/2015 | Chan |
| 2015/0319143 A1 | 11/2015 | Kim et al. |

OTHER PUBLICATIONS

International Search Report and Written Opinion—PCT/US2014/030336—ISA/EPO—dated Oct. 23, 2014.

* cited by examiner

SECURED COMMUNICATION CHANNEL BETWEEN CLIENT DEVICE AND DEVICE MANAGEMENT SERVICE

RELATED APPLICATIONS

This application claims the benefit of U.S. Patent Application No. 61/756,727, filed Jan. 25, 2013.

This application claims the benefit of U.S. Patent Application No. 61/756,748, filed Jan. 25, 2013.

This application claims the benefit of U.S. Patent Application No. 61/756,785, filed Jan. 25, 2013.

This application claims the benefit of U.S. Patent Application No. 61/798,347, filed Mar. 15, 2013.

This application claims the benefit of U.S. Patent Application No. 61/794,977, filed Mar. 15, 2013.

TECHNICAL FIELD

The embodiments herein relate to processing systems and, more particularly, to methods and apparatus to uniquely identify and communicate with client devices to provide care service regardless of location of the client device.

BACKGROUND

Systems and methods are needed to provide a secure communication channels between client devices and device management services.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

One or more of a system, device or apparatus, and method is described in which a unique identification is issued to each device. The unique identification, which is referred to herein as innodevID, is issued to each device that is brought to a mobile device management service of a service provider. The mobile device management service of an embodiment is referred to herein as a care service or, alternatively, an activeCare service. Communication with the device is enabled using a pre-specified address convention. Communication with the device in an embodiment uses but is not limited to the following address convention: innodevID@service_domain/serviceID. This address convention is used for example to send and receive real-time device control command or device information to and from the device and the activeCare service platform. The serviceID portion or component of the address convention is an identification number that is used to represent the logical active session ongoing between the device and the servicing agent during the service call.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
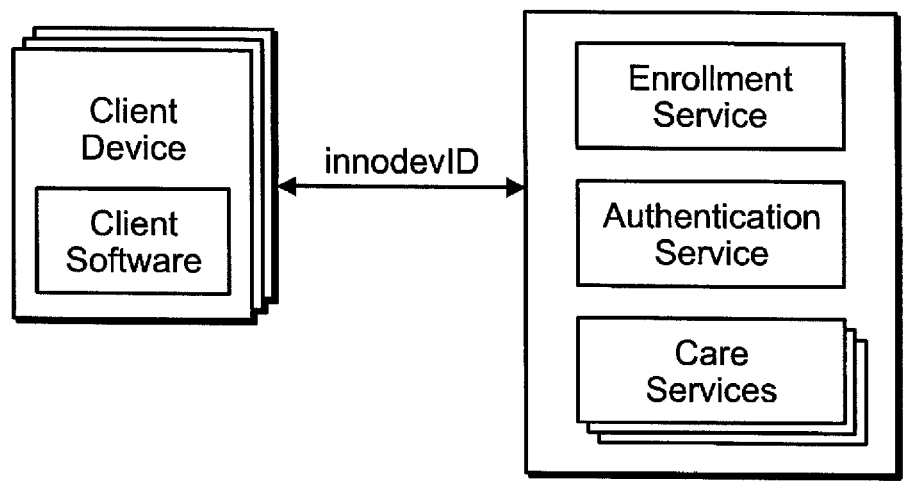
FIG. 1 is a block diagram of a device management service, under an embodiment.

FIG. 1 is a block diagram of a device management service, under an embodiment. The device management service includes a platform, system and/or components comprising one or more of an enrollment service, authentication service and care services or care applications, all of which are described in detail herein. The device management service communicates with one or more client devices, each hosting client software. Communication between the device management service and the client devices involves the use of a unique identification, referred to herein as innodevID, as described in detail herein.

Figure 2:
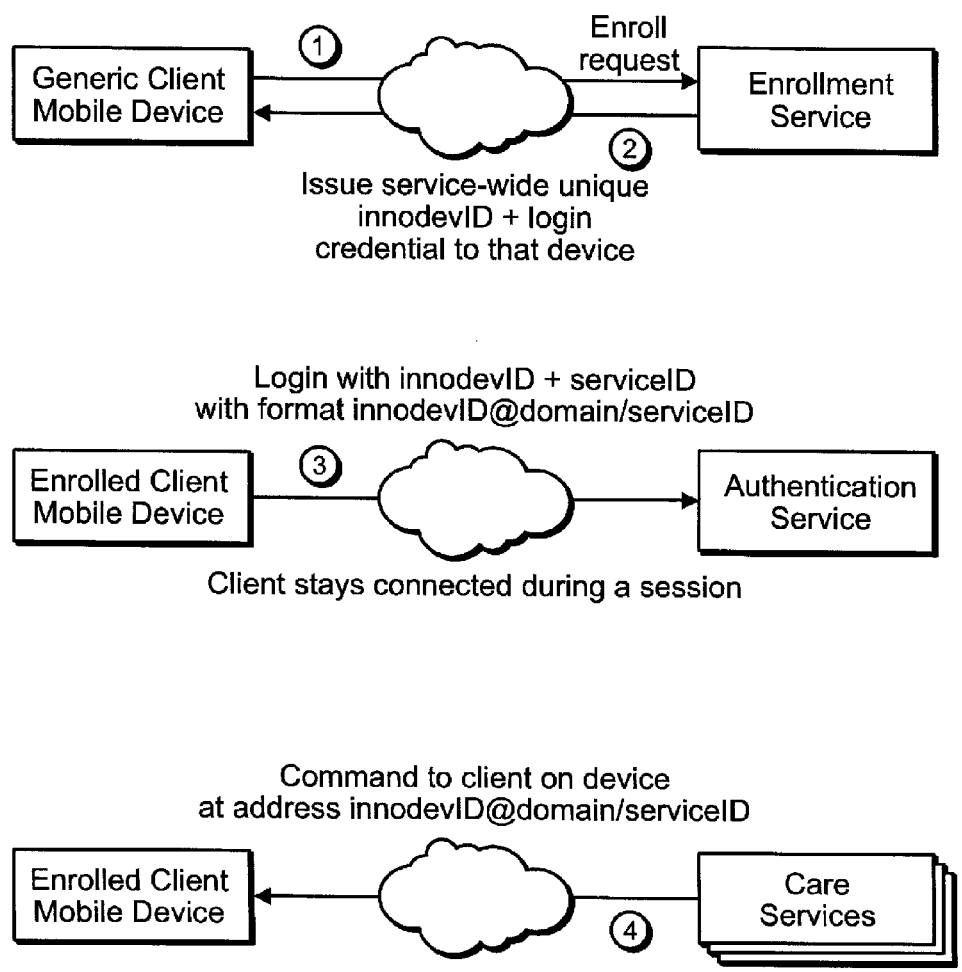
FIG. 2 is a flow diagram for provisioning a client device and assigning a universal identification to the client device, under an embodiment.

FIG. 2 is a flow diagram for provisioning a client device and assigning a universal identification to the client device, under an embodiment. The universal identification assigned to the client device is used by care applications in management of the device, as described below. The client device includes any portable communication device having a wired and/or wireless communication interface by which the device interacts with one or more care applications in a local or remote environment, but is not so limited. The client device couples or connects to the care applications using a communication path that includes any medium for communicating among the computing systems including, but not limited to, wireless couplings and/or connections, wired couplings and/or connections, and hybrid wireless/wired couplings and/or connections. The care services are provided by care applications that include but are not limited to applications hosted on one or more local desktop computers and/or server computers. Further, the care applications include one or more services including but not limited to public services, private services, and/or personal services deploying as cloud or non-cloud based services.

The client device of an embodiment includes one or more applications or modules, referred to herein as client software or software, downloaded from a software distribution service via a communication path and installed on the client device. The client software is loaded onto the device via a user-initiated download from a software distribution program, for example. Alternatively, the client software is loaded onto the device via an automatic download, but the embodiment is not so limited.

As yet another alternative, the client software can be loaded onto the device using a hybrid procedure that includes an automatic procedure combined with some user action. In but one example of a hybrid procedure, the care services send to the client device an electronic message (e.g., electronic mail, SMS, etc.) that includes a link or icon for use in downloading the client software. Following receipt of the electronic message, the user clicks or selects the link or icon in the message and this user action initiates the download of the client software.

Once loaded onto a host client device, the client software of an embodiment is instructed to initiate an enrollment request to a care application but is not so limited. Alternatively, the client software self-recognizes its pre-enrollment state and in response initiates an enrollment request to a care application.

The enrollment request of an embodiment includes a set of information including but not limited to a prearranged enrollment request key and client device-specific information. The device information includes one or more of mobile device identification number, device manufacturer, manufacturer serial number, model number, International Mobile Subscriber Identity (IMSI), International Mobile Station Equipment Identity (IMEI), Mobile Subscriber Integrated Services Digital Network-Number (MSISDN), Ethernet Media Access Control (MAC) address, carrier information, and additional information describing the state of the client device, for example. The information of the enrollment request is sent to the care enrollment service. The care enrollment service upon receiving an enrollment request uses the client device information included in the enrollment request along with information of a knowledge base to which it is coupled to determine if the client device has previously been enrolled.

If a determination is made that the requesting client device has not been enrolled, a unique device identification number, referred to herein as innodevID, is generated by the care application in the application domain. Once generated, the innodevID is issued and assigned to the particular requesting client device. In the case where the enrollment service is hosted or running in multiple locations, such as regional data centers, the unique device identification number includes additional information identifying the location generating the unique device identification number. If a determination is made that the requesting client device has previously been enrolled, then the unique device identification number previously issued during the enrollment is again returned to the requesting client device.

The care enrollment service responds to the enrollment request with the assigned unique device identification number along with an encrypted login credential. The login credential is used for any service request to the care application. Upon receipt of the enrollment response from the care enrollment service, the client software stores the unique device identification and login credential for subsequent use in future service requests. In further response to receipt of the enrollment response, the client software couples or connects to the care application using the unique device identification and the login credential over a secure communication channel such as transport layer security (TLS) and secured sockets layer (SSL), but is not so limited.

Once the requesting client device receives the unique device identification number from the device management service, the care application and its modules or components communicate with the client device using this unique device identification. The unique device identification of an embodiment is in the form of innodevID@domain/serviceID.

The serviced component of the device identification, referred to herein as the service identification notation, is a string of characters and/or numbers assigned to identify an active session between the client device and the care application. As such, the care application and its modules communicate with the client device using this unique device identification regardless of a current location of the client device and regardless of a location of the application modules. Furthermore, the established communication session or path remains connected from the logical perspective of both the client software and the care application until such time as one of the client software and the care application terminate the application session and disconnect the coupling or connection. For example, the client device can connect to the care service via a mobile data network at the start of a session; and during the session the client device switches and connects to a WiFi network. Regardless of the change in the connection during the session, the care application continues to address the client software using the assigned unique client device identifier.

Figure 3:
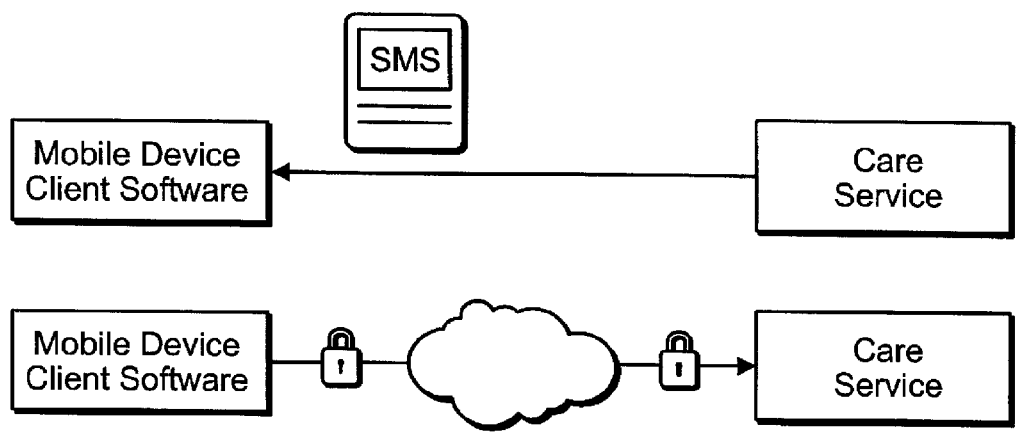
FIG. 3 is a block diagram of a secure coupling or connection established between the care service and client device, under an embodiment.

FIG. 3 is a block diagram of a secure coupling or connection established between the care service and client device, under an embodiment. The client software on the client device of an embodiment, when requested to establish a connection to the care service (e.g., activeCare service), connects to the device management service server using the unique innodevID and serviceID assigned to the client device. The connection with the client device is requested to allow a service agent or other component of the device management service to manage the client device remotely during a service call, for example, but can be requested for other purposes as well. The coupling or connection between the client device and the care service of the device management service comprises of secured TLS-based couplings or connections throughout the active service session as described in detail herein. This logical secured link between the client software and the activeCare service is referred to herein as the activeLink.

The secure communication between the user of the client device pending service, and the service agent or component is enforced at one or more layers. The service agent or component of an embodiment is a human being, who uses the care application of the device management service to assist the user in resolution of any device issue that arises. However, in one or more alternative embodiments the service agent can be an application or other component of the device management service running on the device management platform and automatically performing resolution of any client device issue.

Regardless of whether the service agent or component is a live agent or an automatic component, the service agent issues an electronic message to the user via the client device and the care server software. The purpose of the message, which in an embodiment is a short message service (SMS) message but which could be any type of electronic message, is to ensure that the user is in possession of the device in order to avoid abuses perpetrated by one who is not the owner of the client device. Upon or at some point in time following receipt of the electronic message at the client device, the user activates or selects a component conveyed within the electronic message in order to acknowledge or accept that the service request is from a known source. Activation or selection of the component of the electronic message enables the client software hosted on the client device to retrieve device information and vitals to the care server software for use in a diagnostic process managed by the device management service. The component conveyed within or by the electronic message of an embodiment is a hyperlink (e.g., HTTP hyperlink), but is not so limited. The HTTP hyperlink of an embodiment is set from a known server software location provided by the service agent organization.

Upon or following establishment of the secured transport link between the client device and the device management service, the client software establishes a logical active session with the care service by logging onto the care server software environment and authenticating itself with its unique device identification, innodevID@domain/serviceID, as described in detail herein. Subsequent information exchanges between the client device and the care service software are conducted over the secured channel or link. During the active session between the client device and the service agent, the client software uses the Internet standard transport layer security (TLS) and secured socket layer (SSL) to provide communication security between client and server over the Internet. Furthermore, the service agent participating in an active service session with the user via the client device uses the innodevID@domain/serviceID to identify and communicate only with the designated device, thereby accessing the care service applications over the Internet standard secured HTTPS. Because each end point is now securely connected to the care server software infrastructure, they form a secured and protected communication path between the two acknowledged end points.

As described in detail herein, the care application and its modules, and the service agent, communicate with the client device using the unique device identification assigned to the client device regardless of a current location of the client device and regardless of a location of the application modules. Furthermore, the established communication session or path remains connected from the logical perspective of both the client software and the care application until such time as one of the client software and the care application terminate the application session and disconnect the coupling or connection. Therefore, regardless of the change in the connection during the session, the care application continues to address the client software using the assigned unique client device identifier.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The device management service can be a component of a single system, multiple systems, and/or geographically separate systems. The device management service can also be a subcomponent or subsystem of a single system, multiple systems, and/or geographically separate systems. The device management service can be coupled to one or more other components (not shown) of a host system or a system coupled to the host system.

One or more components of the device management service and/or a corresponding system or application to which the device management service is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the device management service can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the device management service and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the device management service and corresponding systems and methods include: microcontrollers with memory (such as electronically erasable programmable read only memory (EEPROM)), embedded microprocessors, firmware, software, etc. Furthermore, aspects of the device management service and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the device management service and corresponding systems and methods is not intended to be exhaustive or to limit the systems and methods to the precise forms disclosed. While specific embodiments of, and examples for, the device management service and corresponding systems and methods are described herein for illustrative purposes, various equivalent modifications are possible within the scope of the systems and methods, as those skilled in the relevant art will recognize. The teachings of the device management service and corresponding systems and methods provided herein can be applied to other systems and methods, not only for the systems and methods described above.

The elements and acts of the various embodiments described above can be combined to provide further embodiments. These and other changes can be made to the device management service and corresponding systems and methods in light of the above detailed description.

What is claimed is:

1. A method for establishing a secure connection between a client device and a platform remote to the client device, the method performed by the client device and comprising:
receiving a unique device identification generated by the platform;
receiving, from the platform, a service request that requests a service call and includes an electronic link to the platform;
acknowledging receipt of the service request based upon a user activation of the electronic link, the activation indicating, to the platform, that the user is an owner in possession of the client device;
in response to the user activation of the electronic link, establishing a secure channel for a session between the platform and a client application of the client device by logging into a care application of the platform with the unique device identification;
in response to establishing the secure channel, allowing the care application to remotely control the client device via the client application during the session; and
controlling subsequent sessions between the client device and the platform over the secure channel using an address convention comprising the unique device identification and a service identification component that represents a logical active session between the client device and the platform.

2. The method of claim 1, wherein the client device is enrolled with the platform, and the platform comprises a plurality of care applications that provide device management services.

3. The method of claim 1, wherein the unique device identification is received in a response to an enrollment request transmitted to the platform, the enrollment request comprising a request key and device data of the client device.

4. The method of claim 1, wherein the unique device identification is received from the platform in the absence of a previous enrollment event.

5. The method of claim 3, wherein the unique device identification is based, at least in part, on the request key and the device data of the client device.

6. The method of claim 1, wherein the address convention further comprises a service domain identification component.

7. The method of claim 3, further comprising:
automatically initiating the enrollment request at the client application when the client application self-recognizes a pre-enrollment state.

8. The method of claim 3, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network Number (MSISDN), a media access control (MAC) address, carrier data of a carrier corresponding to the client device, and state data of the client device.

9. The method of claim 6, wherein the address convention comprises a form including device_identification@service domain/service identification.

10. The method of claim 1, wherein the unique device identification includes location data of a location from which the unique device identification is issued.

11. The method of claim 3, wherein the response includes an encrypted login credential.

12. The method of claim 11, wherein the client device uses the encrypted login credential to login to the care application.

13. The method of claim 1, wherein the electronic link comprises a hyperlink associated with the platform.

14. The method of claim 6, wherein a subsequent session established between the platform and the client device remains connected logically until one of the platform and the client device terminates the session, regardless of connection point location of the client device.

15. A client device for establishing a secure connection with a platform to receive care services, the client device comprising:
a processor; and
a memory storing one or more programs that, when executed by the processor, cause the client device to perform operations comprising:
receiving a unique device identification generated by the platform;
receiving, from the platform, a service request that requests a service call and includes an electronic link to the platform;
acknowledging receipt of the service request based upon a user activation of the electronic link, the activation indicating, to the platform, that the user is an owner in possession of the client device;
in response to the user activation of the electronic link, establishing a secure channel for a session between the platform and a client application of the client device by logging into a care application of the platform with the unique device identification;
in response to establishing the secure channel, allowing the care application to remotely control the client device, via the client application, during the session; and
controlling subsequent sessions between the client device and the platform over the secure channel using an address convention comprising the unique device identification and a service identification component that represents a logical active session between the client device and the platform.

16. The client device of claim 15, wherein the client device is enrolled with the platform, and the platform comprises a plurality of care applications that provide device management services.

17. The client device of claim 15, wherein the unique device identification is received in a response to an enrollment request transmitted to the platform, the enrollment request comprising a request key and device data of the client device.

18. The client device of claim 15, wherein the unique device identification is received from the platform in the absence of a previous enrollment event.

19. The client device of claim 17, wherein the unique device identification is based, at least in part, on the request key and the device data of the client device.

20. The client device of claim 15, wherein the address convention further comprises a service domain identification component.

21. The client device of claim 17, wherein execution of the one or more programs causes the client device to perform operations further comprising:
automatically initiating the enrollment request at the client application when the client application self-recognizes a pre-enrollment state.

22. The client device of claim 17, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network Number (MSISDN), a media access control (MAC) address, carrier data of a carrier corresponding to the client device, and state data of the client device.

23. The client device of claim 20, wherein the address convention comprises a form including device_identification@service domain/service identification.

24. The client device of claim 15, wherein the unique device identification includes location data of a location from which the unique device identification is issued.

25. The client device of claim 17, wherein the response includes an encrypted login credential.

26. The client device of claim 25, wherein the client device uses the encrypted login credential to login to the care application.

27. The client device of claim 15, wherein the electronic link comprises a hyperlink associated with the platform.

28. The client device of claim 20, wherein a subsequent session established between the platform and the client device remains connected logically until one of the platform and the client device terminates the session, regardless of connection point location of the client device.

* * * * *